Jan. 22, 1924.
N. NILSON ET AL
AUTOMOBILE BRAKE
Filed Sept. 21, 1922
1,481,385
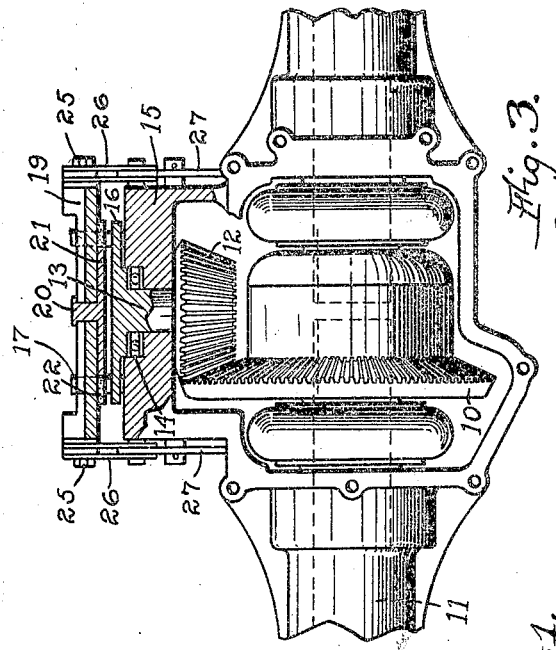
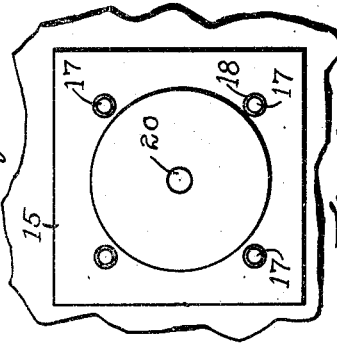
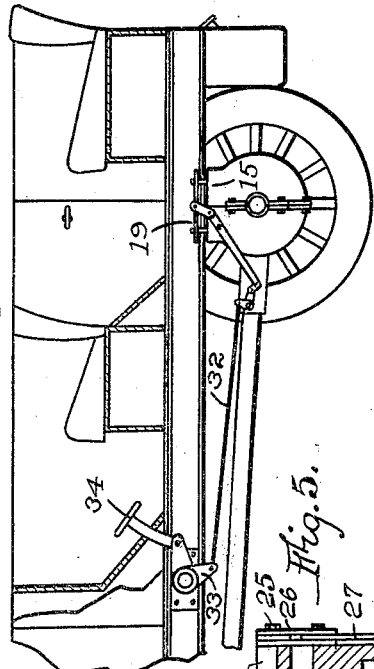
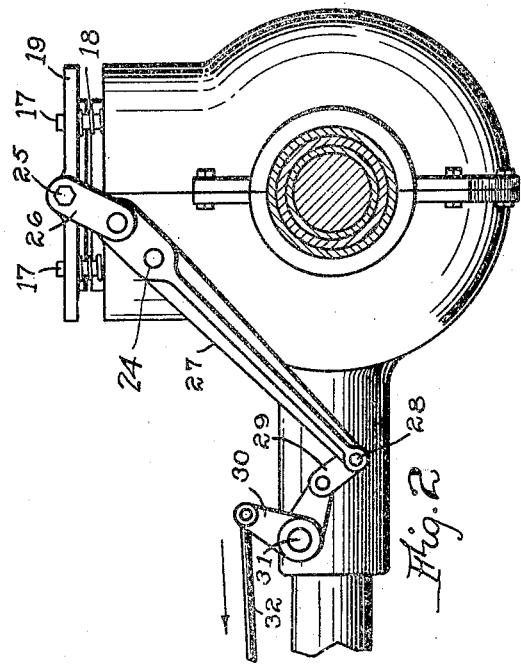
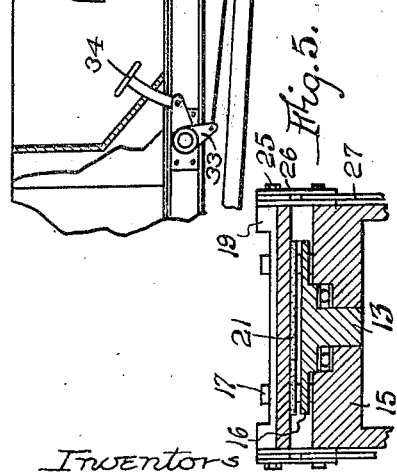
Inventors
Nils Nilson
F. W. Nilson
By Attorneys
Southgate Southgate Patented Jan. 22, 1924.

1,481,385

UNITED STATES PATENT OFFICE.

NILS NILSON AND FREDERICK W. NILSON, OF WORCESTER, MASSACHUSETTS.

AUTOMOBILE BRAKE.

Application filed September 21, 1922. Serial No. 589,660.

*To all whom it may concern:*

Be it known that we, NILS NILSON and FREDERICK W. NILSON, both citizens of the United States, residing at Worcester, in the county of Worcester and State of Massachusetts, have invented a new and useful Automobile Brake, of which the following is a specification.

This invention relates to a service brake for an automobile.

The principal objects of the invention are to provide a brake of such a nature that it can be applied quickly and all the friction surfaces will come into contact simultaneously, thus avoiding unevenness of wear; to provide a brake which will wear evenly and uniformly; to provide a construction which will be without side thrust and will act as rapidly as the operator may desire; to provide a construction which can be located conveniently under the rear part of the vehicle where it will take up no room otherwise occupied and where it can be left open for cooling by air conveniently or closed to exclude dust. Other objects and advantages of the invention will appear hereinafter.

Reference is to be had to the accompanying drawings in which—

Fig. 1 is a side view of an automobile showing a preferred embodiment of this invention applied thereto;

Fig. 2 is a sectional view of the differential shaft showing the brake in side elevation on enlarged scale;

Fig. 3 is a central sectional view of the device;

Fig. 4 is a plan, and

Fig. 5 is a sectional view showing a modification.

In order to provide a brake having the above mentioned advantages the master gear 10 on the main shaft 11 is used to drive a second bevel gear 12 that is from one-half to one-third the size of the gear 10. The gear 12 is mounted on a vertical shaft 13 mounted in ball bearings 14 on the top of the differential casing 15 preferably. This vertical shaft is provided with a horizontal circular friction plate 16 at its top. This can be fixed to the shaft in any desired way so as to rotate positively with it.

On the top 15 we provide guide pins 17 shown as located vertically. Around them we place springs 18 which carry a plate 19 above them having perforations through which the pins 17 pass and by which the plate 19 is guided to move vertically. Through this plate passes a vertical stud 20 centrally located and having supported underneath it a freely rotatable friction disc 21 centered with respect to the disc 16 and of the same size. These discs both consist of steel plates and the disc 21 is provided with a circular layer of friction material 22 including asbestos. This also is preferably of annular form. The layer on one side is adapted to come into contact with the plate 19 above and on the other side with the disc 16 below. The springs 18 normally hold the plate 19 up so that the two discs are not in contact. Preferably the device is designed so that ordinarily there will be a clearance of about $\frac{1}{16}$ of an inch between the two discs 16 and 21.

The plate 19 is provided with a pair of bolts 25 or the like in alignment at the opposite sides on which are pivoted a pair of links 26. These links are in turn pivoted to the ends of the pair of levers 27 which are pivoted on two opposite studs 24 and carry at their ends pins 28. To these pins 28 are pivotally connected links 29 which operate two arms fixed on a cross rod 31. A central arm 30 on this rod is connected by a link 32 with a bell crank 33 near the front of the car to the opposite arm of which is connected the brake pedal 34.

When the operator wishes to stop the car he presses as usual on the pedal 34. This depresses the bell crank 33 and draws the link 32 in the direction of the arrow in Fig. 2, swings up the bell crank 30 and the link 29. This acts through the levers 27 to pull down on the links 26 and depress the plate 19. The action of this is to force the disc 21 on the under side of this plate down into contact with the constantly rotating disc 16 and clamp this disc 21 between the rotating disc 16 and the stationary plate 19. This applies friction all over the surfaces of these discs and immediately slows up the operating shafts and stops the machine in a quick but smooth manner. After the plate is forced down hard the discs will still rotate a part of a revolution before coming to a full stop, so the action will not be absolutely instantaneous.

The surfaces on which the friction is exerted are flat and have such relation to each other that they will necessarily wear uniformly and there can be no part of these surfaces that will not receive its due proportion of wear. Therefore, these surfaces will remain flat after long use, thus eliminating one of the important objections to the ordinary circular friction brake. Furthermore, the parts are so arranged that if it is necessary to disconnect them for cleaning or inspection or any other purpose that can be done simply by removing the bolts 25 and taking out the plate 19 which leaves everything exposed. There will ordinarily be no necessity for adjustment, but after a great amount of wear adjustments can be provided for at any convenient point in the leverage. The device is designed so that the leverage is the same on both sides, therefore adjustment will not be attempted until the device is almost worn out. The whole device is open so that it can get full air circulation, there is nothing about it requiring lubrication and it is so arranged that if protection from dust is more important than the circulation of air, the sides can be closed very easily.

In this brake the asbestos will always be free from grease which is the cause of so much trouble in the present brakes. In case of emergency this brake has power enough to lock the wheels and serve as an emergency brake and it can be kept in good condition by the owner, which saves both time and money.

It will be understood, of course, that the friction discs will be designed for the particular size and weight of the car on which they are to used and it will be obvious that comparatively small discs can be employed as the friction is provided on both sides and is necessarily provided throughout the entire areas of the friction surfaces. Even if these surfaces are not true when the car is set up they will be worn through by the action of the device and there is no way in which they can be worn so as to reduce the friction area unless grit or the like gets in between these surfaces.

For small cars the upper disc can be omitted as shown in Fig. 5 and then the friction between the lower disc 16 and the non-rotatable plate is relied upon. The bottom of the plate would then have a friction surface 21 like that on the upper disc in Fig. 3.

Although we have shown and described only a single form of the invention and shown it as applied to only one kind of machine, we are aware of the fact that modifications can be made therein by any person skilled in the art without departing from the scope of the invention as expressed in the claims.

Therefore we do not wish to be limited to all the details of construction herein shown and described but what we do claim is:—

1. In a brake for an automobile, the combination with a circular flat disc positively connected with the driving mechanism to rotate whenever the car is moving, of a circular disc of the same size and shape normally supported a slight distance from it and freely rotatable on its axis, a reciprocable non-rotatable plate beyond the second disc, and means for moving the plate to bring the second disc into contact with the first disc to apply the friction.

2. In a brake, the combination of a horizontal flat disc positively connected to a driving shaft to rotate with it at a higher speed and having a friction surface on the top thereof, a flat plate mounted above said disc capable of moving in an axial direction toward it, a second disc freely mounted to turn on the lower side of said plate and having a flat friction surface on each side, and means for moving the plate downward to bring the said discs into contact and press the upper disc into contact with the bottom of said plate for the purpose of applying a friction to resist the rotation of the lower disc and the driving shaft of the car.

3. In a brake for an automobile, the combination of a horizontal flat disc located over the rear axle and positively connected to it to rotate with it at a higher speed and having a friction surface on the top thereof, a flat plate mounted above said disc capable of moving in an axial direction toward it, a second disc freely mounted to turn on the lower side of said plate and having a flat friction surface on each side, means for moving the plate downward to bring the said discs into contact and press the upper disc into contact with the bottom of said plate for the purpose of applying a friction to resist the rotation of the lower disc and the driving shaft of the car, guides mounted under the rear of the car for guiding said plate to move in a direction directly toward the lower disc, and yielding means for normally holding said plate up to provide a clearance between the two discs.

4. In a brake, the combination of a horizontal flat disc positively connected to a driving shaft to rotate with it at a higher speed, a flat plate mounted above said disc capable of moving in an axial direction toward it, and means for moving the plate downward to press the disc into contact with the bottom of said plate for the purpose of applying a friction to resist the rotation of the disc and the driving shaft of the car.

In testimony whereof we have hereunto affixed our signatures.

NILS NILSON.
FREDERICK W. NILSON.